March 16, 1948.  T. FREESZ  2,438,044
FASTENER CONSTRUCTION
Filed March 20, 1944
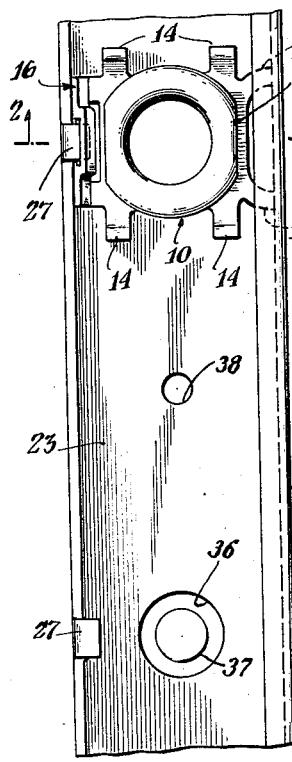
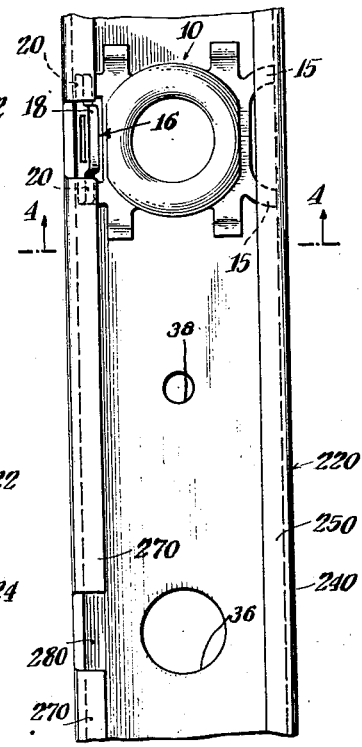
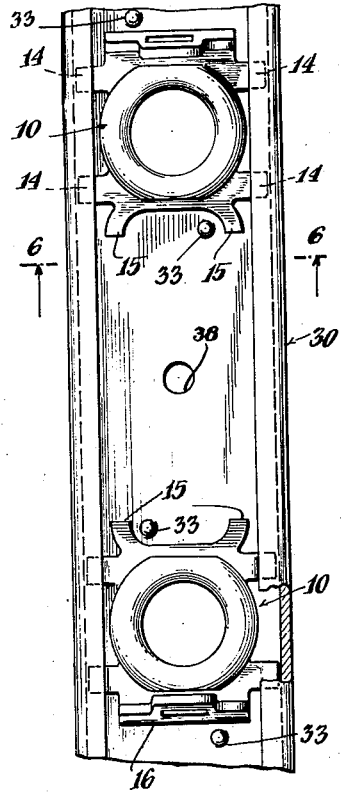
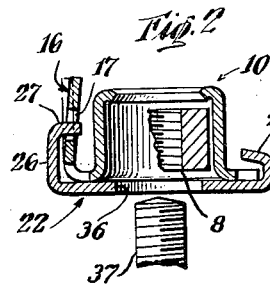
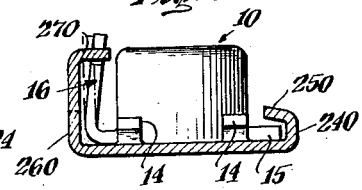
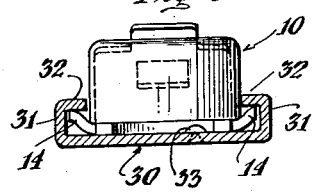
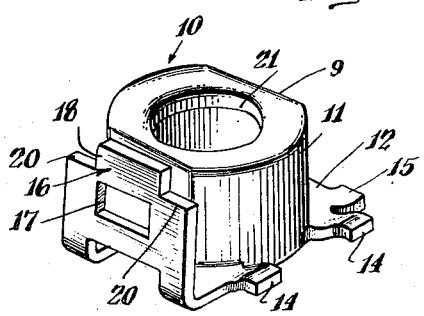
INVENTOR.
Tibor Freesz
BY Duell, Kane and Smoot
ATTORNEYS Patented Mar. 16, 1948

2,438,044

UNITED STATES PATENT OFFICE 2,438,044

FASTENER CONSTRUCTION

Tibor Freesz, New York, N. Y., assignor to Camloc Fastener Corporation, New York, N. Y., a corporation of New York Application March 20, 1944, Serial No. 527,193

7 Claims. (Cl. 24—221)

This invention relates to fasteners of the self-positioning type known in the trade as "floating" fasteners.

It is an object of the present invention to provide a housing for a fastener element, such as a nut, or a cam collar such as disclosed in Summers U. S. Patent No. 2,239,125, dated April 22, 1941, which when used with any of several forms of retainers, permit relative movement with respect to a structure to which the retainer may be fastened.

It is an object of the invention to provide a fastener housing which is adaptable for use with certain commercial types of retainer now commonly used in industry.

It is an object of the invention to provide a fastener housing which affords self-adjustability of positioning in the retainer, whereby minor defects in structures to be joined together, such as misalignment of holes provided for the passage of a screw or other fastener element, will not result in rejects, or require additional time or labor in fastening such structures together.

It is an object of the invention to provide a fastener housing of simple, inexpensive construction, which may be employed with equal facility and satisfactory operating results, several presently used, and essentially different retainers, thereby to eliminate the necessity of employing a specialized fastener housing with any one of said retainers. This object is of particular value in fasteners employed on military equipment, where speedy emergency repairs are frequently required.

In the drawings:

Fig. 1 is a top plan view of a novel form of gang-type retainer with a fastener housing embodying the present inventions, positioned therein;

Fig. 2 is a section taken on line 2—2 of Fig. 1, the view also showing a portion of the nut, in section, which may be disposed within the fastener housing;

Fig. 3 is a top plan view of the fastener housing in combination with a second form of retainer;

Fig. 4 is an end elevation, in section on line 4—4 of Fig. 3;

Fig. 5 is a top plan view showing the application of the fastener housing to a third form of retainer;

Fig. 6 is an elevation of the same taken on lines 6—6 of Fig. 5; and

Fig. 7 is a perspective of the fastener unit housing according to a preferred form of the present invention.

Referring to the drawings, and particularly to Figs. 1 and 7, the fastener housing 10 comprises a body portion or shell 11 which desirably is non-circular, as shown at 9, to accommodate an internally positioned fastener unit 8, see Fig. 2, which has similar non-circular configuration, and is thereby held against rotation within the body 11. Said fastener housing is conveniently formed by drawing or cupping operations, and has, preferably as an integral part thereof, a base 12 of which three sides are characterized by extending lugs. On two opposite sides, the lugs, identified as 14, 14, see Fig. 1, are outwardly extending tabs which slope upwardly, see Figs. 6 and 7, for a purpose later described. The third set of lugs, 15, 15, is desirably positioned in the plane of the base 12, see Fig. 4. The fourth side, opposite the lugs 15, 15, has an upwardly extending wall 16, see Fig. 4, preferably sloping in the direction of the housing 10 at a slight angle, say five degrees. The wall 16 is distinguished by an aperture 17 disposed symmetrically with relation to the boundaries of the wall, and a tab 18 which projects upwardly between sharply defined shoulders 20, 20.

The fastener unit positioned within the housing 11 may be a nut such as is shown at 8 in Fig. 2 or other device, such as a cam collar as disclosed in said U. S. Patent No. 2,239,125; the bore or central opening of the nut or cam collar registers with the aperture 21 of the housing.

The housing 10 is adapted for use with any of a number of retainers, of which three accepted forms are illustrated.

Referring to Figs. 1 and 2, the retainer 22 has a web 23, and a side wall 24 which has an inwardly extending ledge 25, wall 24 and ledge 25 forming an inwardly-turned flange. The retainer is further provided with an opposite side wall 26 which is preferably substantially vertical and provided with inwardly extending tabs 27 at the locations at which the housings 10 are to be positioned in the retainer 22.

It will be understood by making the retainer 22 of suitable length, any convenient number of housings may be disposed thereon. Similarly, the retainer 22 may be individual to a single housing 10.

In the application of the housing 10 to a retainer 22, the housing is positioned with the lugs 15 beneath the ledge 25, and with the aperture 17 aligned with the tab 27. Thereupon, on rotating the housing counterclockwise of Fig. 2, the wall 26 yields until the tab 27 meets the aperture 17, whereupon the wall 26 snaps forward, with its tab projecting into the aperture 17, see Figs. 1 and 2. After the housing is in its Fig. 2 position, the wall 16 may be straightened if desired, as shown in broken lines in Fig. 2, to insure against accidental separation of the housing from the retainer.

Fig. 3 shows another form of retainer 220, in which a side wall 240 and inwardly extending ledge 250 are similar to the corresponding elements of retainer 22. In retainer 220, however, the opposite wall 260 extends upwardly and has an inwardly extending flange 270 which is interrupted at locations at which the housings 10 are to be placed, with spaces 280. The height of the said wall 270 is slightly greater, see Fig. 4, than the height of the respective shoulders 20 of the housing wall 16; the length of the respective spaces 280 is slightly greater than the width of the tab 18.

The housings 10 are positioned with their respective extensions 15 beneath the ledge 250, and the housing is again rotated counterclockwise, whereupon the wall 260 will yield until the flanges 270 on each side of the opening 280 pass the shoulders 20, whereupon the wall will snap into vertical position to bring the said flanges 270 above the shoulders 20 of the wall 16. The structure will then be in the Fig. 4 position, and the wall 16 may then be straightened as shown in broken lines in Fig. 4, again with the objective of preventing accidental separation of the housing and retainer.

In the Figs. 1 and 3 constructions, the dimensioning of the coacting parts of housing and retainer are such that the housings are not rigidly held within the retainer, but are permitted a substantial amount of play or freedom of movement laterally and vertically with respect to the retainers.

To employ the invention with a form of retainer, 30, shown in Fig. 5, said retainer having substantially identical side walls 31, 31, each of which has an inwardly extending ledge 32, the housing is rotated ninety degrees in the plane of the base of the retainer. The housings are slid into the retainer from an end thereof, with the lugs 14, 14 beneath the inwardly extending flanges 32 of the side walls 31. In the illustrated standardized form of retainer 30, the inwardly extending ledges 32 are spaced above the base of the retainer a distance greater than the normal thickness of the base 12 of the housing 10, and by striking the lugs 14 upwardly, as aforesaid, excess vertical play is avoided. In the combination of the housing 10 and the retainer 30, it will again be understood that the dimensioning of the cooperating elements provides for a limited lateral adjustment.

After positioning, the housings 10 are restrained against longitudinal movement within the retainer 30 by upwardly dimpling the retainer base as indicated at 33, 33, in Fig. 5, the displacement of the metal of the base being preferably at locations as indicated in Figs. 5 and 6, and of such height that the housing will not ride over the dimples 33 but will be loosely confined with a limited degree of movement laterally and longitudinally of the housing.

In the several embodiments illustrated, the base of the respective retainers is provided with apertures 36 which are located at the ultimate locations of the housings 10, through which apertures the complementary fastener unit— screw or stud or the like, and indicated generally at 37 in Figs. 1 and 2—passes to engage with whatever type of fastener structure is contained within the housings 10. The respective base apertures 36 are sized according to the extent of lateral and transverse movement afforded the housings 10 within the respective retainers, and are oversized with respect to the screw or stud 37 which is to pass therethrough, so that at the extremes of movement of the housings 10 within the respective retainers, a clear aperture through the base of said retainers at least equal to the diameter of the screw or stud, is provided.

In either a unitary or gang type of retainer, the base thereof may be provided with apertures 38 at suitable locations intermediate successive housing positions to provide for the riveting or other securement of the retainers to a structure which is to be secured to another structure or device.

Whereas it is obvious that among others the several objects of the invention as specifically afore noted are achieved, it is apparent that numerous changes in construction and rearrangements of the parts might be resorted to without departing from the spirit of the invention as defined by the claims.

I claim:

1. A fastener structure, comprising a shell adapted to receive a fastener element, a base for said shell, said base having extending lugs and a substantially vertical wall disposed in spaced relationship to a side of said shell, said wall having an aperture therein, and a retainer for said shell, including a channel having one side wall inwardly curving to overlie the extending lugs of the base, and an opposite wall provided with a projecting tab adapted to pass through said aperture to loosely secure said shell within said retainer.

2. A fastener structure, comprising a shell having a non-cylindrical portion within which a fastener element may be non-rotatably housed, a relatively flat base for said shell, a substantially vertical wall extending upwardly from said base, said wall having an aperture therein, and a retainer structure for said shell, said retainer structure including a member overlying the base of said shell in relatively closely spaced relationship therewith, and a tab member provided on the retainer structure projecting through the aperture in said vertical wall to relatively loosely secure said shell within said retainer.

3. A fastener structure comprising the combination with a shell having an outwardly extending base portion and a substantially vertical wall, said wall having a tab extending upwardly from relatively sharply defined shoulders, of a retainer having an inwardly turned flange overlying a marginal edge of said base portion and a wall having spaced flanges adapted to overlie the shoulders of said shell wall in either side of the tab portion thereof.

4. A fastener structure comprising a shell which may receive a fastener element and a retainer for the shell, said shell including a base provided on one side thereof with laterally-extending lugs and on its opposite side with a substantially-vertical wall disposed in spaced relationship to a side of said shell, said wall having an aperture therein, the retainer including a base portion, an inwardly-turned flange along one edge thereof which overlies the laterally-extending lugs of the shell, a wall along the opposite edge of the base portion, and an inwardly-projecting tab on such wall which passes through the aperture to loosely secure the shell within the retainer.

5. A fastener structure comprising a plurality of shells which may receive fastener elements and a retainer for mounting the shells in spaced relationship, each shell including a base provided on one side thereof with laterally-extending lugs and on its opposite side with a substantially-vertical wall disposed in spaced relationship to a side of said shell, said wall having an aperture therein, the retainer including a base portion, an inwardly-turned flange along one edge thereof which overlies the laterally-extending lugs of the shells, a wall along the opposite edge, and inwardly-projecting tabs on such wall which pass through the apertures in the shells to loosely secure the shells within the retainer.

6. A fastener structure comprising a shell which may receive a fastener element and a retainer for the shell, said shell including a base provided on one side thereof with laterally-extending lugs and on its opposite side with a substantially-vertical wall disposed in spaced relationship to a side of said shell, a tab extending upwardly from such wall, the retainer including a base portion, an inwardly-turned flange along one edge thereof which overlies the laterally-extending lugs of the shell, a wall along the opposite edge, and inwardly-projecting spaced flanges on said wall which overlie the shoulders of said shell wall on each side of the tab.

7. A fastener structure comprising a fastener element, a shell for engagement with said fastener element, said shell having a base provided with laterally-extending lugs, a wall extending upwardly from one end of said base, said wall having an aperture, and means for retaining said shell, including a wall overlying said base and an opposite wall having a lug extending into said aperture.

TIBOR FREESZ.

REFERENCES CITED

The following references are of record in the file of this patent:

UNITED STATES PATENTS

| Number | Name | Date |
| --- | --- | --- |
| 2,324,269 | Poupitch | July 13, 1943 |

FOREIGN PATENTS

| Number | Country | Date |
| --- | --- | --- |
| 462,482 | Great Britain | Mar. 10, 1937 |
| 532,830 | Great Britain | 1941 |